(12) United States Patent  
Yoon (10) Patent No.: US 11,781,606 B2  
(45) Date of Patent: *Oct. 10, 2023

(54) ROTARY SHAFT ASSEMBLY

(71) Applicant: AUTODYN SYS INC., Incheon (KR)

(72) Inventor: Jongyun Yoon, Incheon (KR)

(73) Assignee: AUTODYN SYS INC., Incheon (KR)

( * ) Notice: Subject to any disclaimer, the term of this patent is extended or adjusted under 35 U.S.C. 154(b) by 122 days.

This patent is subject to a terminal disclaimer.

(21) Appl. No.: 17/432,972

(22) PCT Filed: Jul. 20, 2020

(86) PCT No.: PCT/KR2020/009558  
§ 371 (c)(1),  
(2) Date: Aug. 23, 2021

(87) PCT Pub. No.: WO2021/075675  
PCT Pub. Date: Apr. 22, 2021

(65) Prior Publication Data  
US 2022/0154779 A1     May 19, 2022

(30) Foreign Application Priority Data

Oct. 16, 2019   (KR) ........................ 10-2019-0128511  
Apr. 28, 2020   (KR) ........................ 10-2020-0051364

(51) Int. Cl.  
   *F16D 23/14*        (2006.01)  
   *F16D 15/00*        (2006.01)  
   (Continued)

(52) U.S. Cl.  
CPC ............. *F16D 23/14* (2013.01); *F16D 15/00* (2013.01); *F16D 23/12* (2013.01); *F16H 25/12* (2013.01);  
(Continued)

(58) Field of Classification Search  
CPC ........ F16D 15/00; F16D 23/12; F16D 23/123; F16D 23/14; F16D 2023/141;  
(Continued)

(56) References Cited

U.S. PATENT DOCUMENTS 2,065,980 A * 12/1936 Maybach .............. B60W 10/02  
                                        192/85.48  
2,567,043 A * 9/1951 Wemp ............... B60W 30/1819  
                                          477/80  
(Continued)

FOREIGN PATENT DOCUMENTS

CN          202283580 U     6/2012  
JP           2008-224025 A    9/2008  
(Continued)

*Primary Examiner* — Richard M Lorence  
(74) *Attorney, Agent, or Firm* — KORUS Patent, LLC; Seong Il Jeong (57) ABSTRACT

The present invention provides a rotary shaft assembly applied to a novel clutch system that ensures a 100% torque transmission rate between an engine and a transmission in a vehicle system and can be commonly applied to conventional manual transmission vehicles and automatic vehicles. The rotary shaft assembly converts linear motion of one member to rotary motion of another member, using a combination of a protrusion and an inclined guide slot.

5 Claims, 9 Drawing Sheets

(51) Int. Cl.
*F16D 23/12* (2006.01)
*F16H 25/18* (2006.01)
*F16H 25/12* (2006.01)

(52) U.S. Cl.
CPC ..... *F16H 25/186* (2013.01); *F16D 2023/123* (2013.01); *F16D 2023/141* (2013.01)

(58) Field of Classification Search
CPC ........... F16D 2041/0646; F16D 41/086; F16D 2023/123; F16H 25/12; F16H 25/186
USPC ...................................................... 192/93 C
See application file for complete search history.

(56) References Cited

U.S. PATENT DOCUMENTS

| | | | | |
|---|---|---|---|---|
| 4,084,672 | A | * | 4/1978 | Avins ..................... B60K 23/06 477/171 |
| 11,542,991 | B2 | * | 1/2023 | Yoon ....................... F16D 15/00 |

FOREIGN PATENT DOCUMENTS

| | | |
|---|---|---|
| JP | 2016-156440 A | 9/2016 |
| JP | 2017-133606 A | 8/2017 |
| KR | 20-0313732 Y1 | 5/2003 |

\* cited by examiner

ROTARY SHAFT ASSEMBLY

FIELD OF THE INVENTION

Applicant of the present invention suggested a connection part transmitting a driving force of a power transmission device to a clutch device, in Korean Application No. 10-2019-0128511 filed on Oct. 16, 2019. The connection part is applied to a clutch system comprising a power transmission device interlocking with an accelerator and brake pedal, which is disclosed in another Korean Application No. 10-2019-0166488 filed on Dec. 13, 2019.

In Korean Application No. 10-2020-0034811 filed on Mar. 23, 2020, applicant suggested a clutch assembly comprising an out-cam rotating in one direction or the other direction according to pressing or releasing of an accelerator or brake pedal, and a forked part supporting a rotary member that comes in contact with the out-cam.

The present invention relates to a novel rotary shaft assembly that is improved from an invention in Korean Application No. 10-2019-0128511. More specifically, the present invention provides a rotary shaft assembly that has a suitable structure to the invention in Korean Application No. 10-2020-0034811.

BACKGROUND OF THE INVENTION

The wheels of the vehicle rotate in such way that rotations of the engine are changed in the transmission through the flywheel and clutch discs, and transmitted to the main shaft.

In case of manual transmission vehicles, the connection or disconnection of the flywheel and disc is achieved by the clutch pedal installed on the upper floor of the left side of the driver's seat. When the clutch pedal is pressed, the connection between the two members is cut off; when the pedal is released, the two member are connected. When the driver presses the clutch pedal, shifts the gear in a state of pressing the clutch, and then slowly takes the foot off the pedal, the vehicle becomes in a state of a semi-clutch, which is about to come into contact between the flywheel and disk.

In case of automatic transmission vehicles, the vehicles do not have a clutch pedal, and are driven by detecting rotations of the engine, speed of the vehicle, and automatically shifting the transmission depending on the vehicle loads. The vehicle consists of the torque converter, the oil pump, the hydraulic clutch, the planetary gear set, the rotary sensor, the deceleration gear, and the valve body. The transmission part consists of a combination of the planetary gear set, the wet multi-plate clutches, and the brake.

Manual and automatic transmission vehicles have developed by imitating strengths of each other. For example, manual transmission vehicles have adopted the automatic control algorithms of the automatic transmission; automatic transmission vehicles have partially adopted the mechanical friction clutch of the manual transmission for improving fuel efficiency. However, the design structures of the manual and automatic transmission vehicles have retained the first developed platforms, respectively.

In case of automatic transmission vehicles, they have to be switched in conjunction with the clutch pedal at the same time; thus, there is a low preference in South Korea and North America due to slipping when re-starting on ramps. Accordingly, it is necessary to develop a system that enables transmission without a clutch pedal and that prevents slipping on ramps.

In case of automatic transmission vehicles, they have a low fuel efficiency due to the torque transmission through fluid, and are vulnerable to a torque short that is transferred into the transmission from the engine in the abnormal event such as a sudden unintended acceleration. Accordingly, it is necessary to develop a system that eliminates possibilities of a sudden unintended acceleration by mechanically operating states of acceleration, semi-clutch, and stop.

DETAILED DESCRITION OF THE INVENTION

Technical Problems

Accordingly, the present invention is suggested to provide a rotary shaft assembly applied to a novel clutch system, which ensures a 100% torque transmission rate between an engine and a transmission in a vehicle system and can be commonly applied to conventional manual transmission and automatic devices.

Summary of the Invention

To solve the problems mentioned above, the present invention provides a rotary shaft assembly converting linear motion of a driving shaft to rotary motion of a rotatable cam of a clutch assembly, wherein the driving shaft linearly moves according to pressing or releasing of an accelerator pedal or brake pedal, wherein at least one of protrusion is formed in a sleeve of a rotary shaft of the cam, wherein at least one of guide slot is formed on the driving shaft to receive the protrusion, respectively, wherein the guide slot includes: a first path having a linear shape, and a second path extending to form an inclined angle with the first path, wherein the protrusion rotates in a first rotary direction, by an inclined angle formed between the first and the second path according to linear movement of the driving shaft in a first linear direction, thereby rotating the cam.

The protrusion may rotate in a second rotary direction that is opposite to the first rotary direction, by an inclined angle formed between the first and the second path according to linear movement of the driving shaft in a second linear direction that is opposite to the first linear direction, thereby rotating the cam.

The clutch assembly may include a forked part having a rotary shaft that does not rotate regardless of linear movement of the driving shaft, wherein at least one of protrusion is formed on the rotary shaft of the forked part, wherein the driving shaft has a guide slot having a linear shape to receive the protrusion formed in the rotary shaft of the forked part.

In addition, the present invention provides a rotary shaft assembly converting motion of a driving shaft to rotary motion of a cam, wherein at least one of protrusion is formed in a sleeve of a rotary shaft of the cam, wherein at least one of guide slot is formed on the driving shaft to receive the protrusion, respectively, wherein the guide slot includes: a first path having a linear shape, and a second path extending to form an inclined angle with the first path, wherein the protrusion rotates in a first rotary direction, by an inclined angle formed between the first and the second path according to linear movement of the driving shaft in a first linear direction, thereby rotating the cam.

Furthermore, the present invention provides a rotary shaft assembly converting linear motion of a driving shaft to rotary motion of a rotatable cam of a clutch assembly, wherein the driving shaft linearly moves according to pressing or releasing of an accelerator pedal or brake pedal, wherein a first protrusion and a second protrusion are formed in a sleeve of a rotary shaft of the cam, wherein an upper guide slot and a lower guide slot are formed on the driving shaft to receive the first and the second protrusion, respectively, wherein the upper guide slot includes: a first path having a linear shape, and a second path extending to form an inclined angle with the first path, wherein the lower guide slot has the same shape as the upper guide slot rotated 180 degrees, and the lower guide slot includes: a third path having a linear shape, and a fourth path extending to form an inclined angle with the third path, wherein the first protrusion rotates in a first rotary direction, by an inclined angle formed between the first and the second path according to linear movement of the driving shaft in a first linear direction, wherein the second protrusion rotates in the first rotary direction, by an inclined angle formed between the third and the fourth path according to linear movement of the driving shaft in the first linear direction, wherein the cam rotates according to rotations of the first and the second protrusion.

Technical Effects of the Invention

The rotary shaft assembly of the clutch system of the present invention can expand the base of manual transmission vehicles with simplified transmission, and enables accurate and permanent uses by interlocking with the accelerator and brake pedal.

In addition, the rotary shaft assembly of the present invention mechanically operates power transmission, thereby preventing sudden unintended acceleration and enabling protection of both drivers and pedestrians.

Furthermore, the rotary shaft assembly of the present invention can be applied to all vehicles. In case of hybrid cars, the rotary shaft assembly can replace the main component that transmits power generated from the internal combustion engines at the point that the internal combustion engine operates. In addition, the rotary shaft assembly can be applied to the components that require power transmission in a large system such as electric vehicles and other power plants, which uses the internal combustion engines.

DETAILED DESCIPTION EMBODIEMENTS OF THE INVENTIONS

Hereafter, the present invention will be described in detail in conjunction with the accompanying drawings. All terms used in the specification and claims may not be limited to be interpreted as definitions in a generally-used dictionary, and may be defined according to the inventive concept of the present invention. The embodiments in the specification and structures shown in drawings are embodiments of the present invention, and are not restricting or limiting the scopes of the inventive concepts of the present invention.

Before describing the rotary shaft assembly, the overall configuration of the clutch system and the clutch assembly will be explained referring to FIGS. 1 to 9.

<Overall Configuration of Clutch System>

Figure 1:
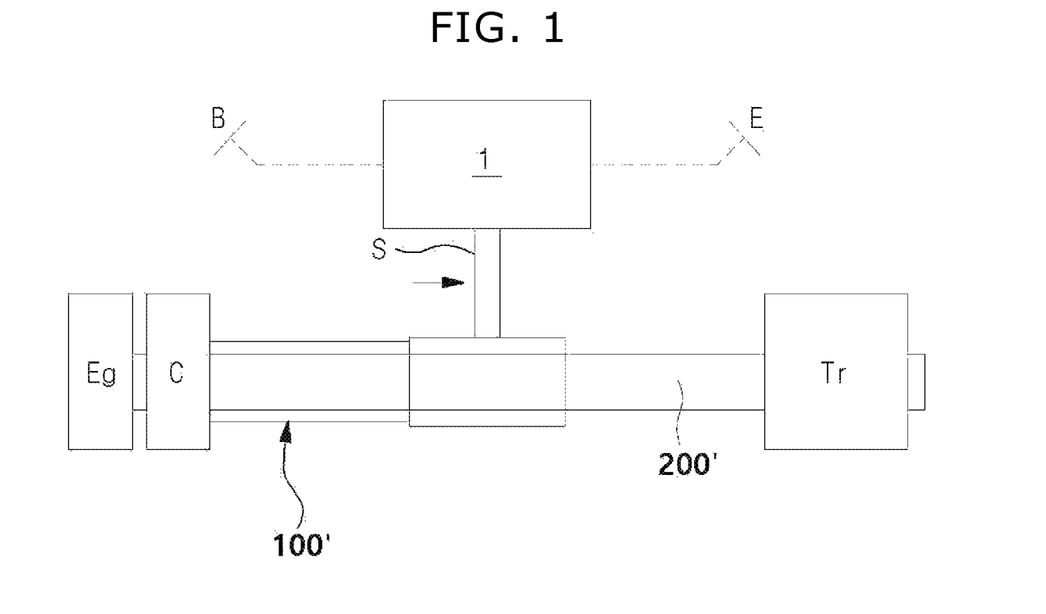
FIG. 1 is a schematic drawing of a clutch system of the present invention.

FIG. 1 is a schematic drawing of a novel clutch system of the present invention.

The clutch system comprises an engine Eg, and a clutch assembly C connected or disconnected to the engine Eg. An input shaft 200' connects between the clutch assembly C and a transmission Tr. The configurations and functions of the engine Eg, the transmission Tr, and the input shaft 200' have been already disclosed; however, any of the conventional or newly developed ones can be used.

The location and state of the clutch assembly C are changed by pressing or releasing an accelerator pedal E, or pressing or releasing a brake pedal B. A power transmission device 1 and a driving shaft 100' are provided to transmit a state of pressing or releasing of the accelerator pedal and the brake pedal E, B to the clutch assembly C. The power transmission device 1 and the driving shaft 100' are connected to each other through a connection member S such as rod. The operation of the power transmission device 1 is transmitted to the driving shaft 100', and the operation of the driving shaft 100' is transmitted to the clutch assembly C. The driving shaft 100' is not connected to the transmission Tr. One side of the power transmission device 100 interlocks with the accelerator pedal E through a certain part, a cable for example, and the other side of the power transmission device 100 interlocks with the brake pedal B.

Figure 2:
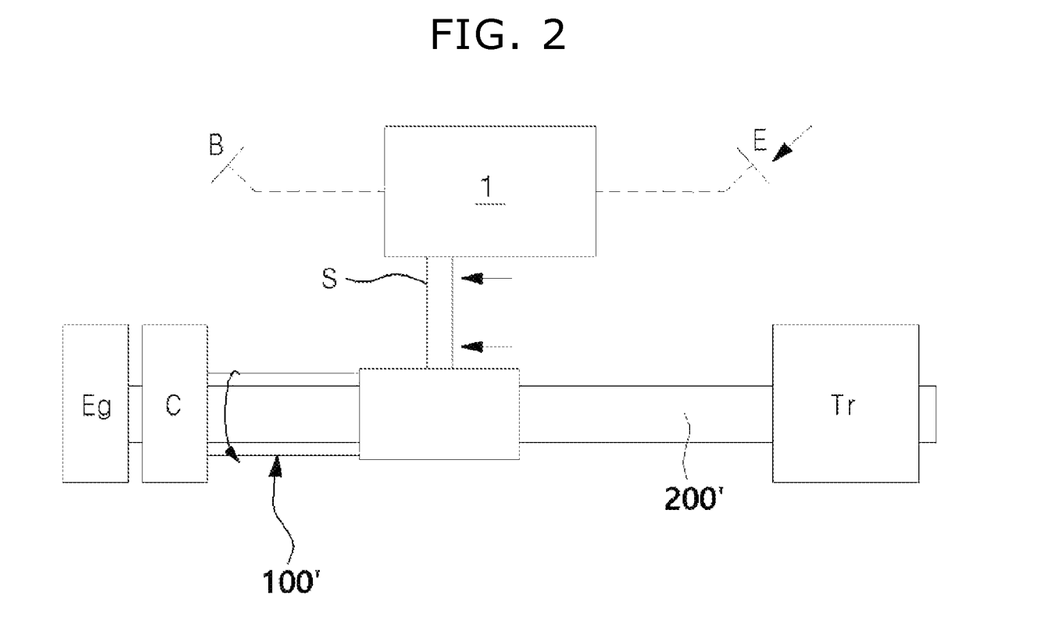
FIG. 2 is a schematic drawing of the clutch system when a driver presses an accelerator pedal.

FIG. 2 is a schematic drawing of the clutch system when the driver presses the accelerator pedal E.

When the driver presses the accelerator pedal E, the connection member S linearly moves to a first direction of FIG. 2, to the left side for example, according to the operation of the power transmission device 1. Then, the driving shaft 100' linearly moves to the left side, and the linear motion of the driving shaft 100' is converted to rotary motion of the clutch assembly C. Accordingly, the clutch assembly C transitions to "a first state". In the first state, the clutch assembly C transmits the rotational force of the engine Eg to the transmission Tr through the input shaft 200'. When the driver keeps pressing the accelerator pedal E, the increased rotational force of the engine Eg is transmitted to the transmission Tr, and the clutch assembly C maintains the first state.

Figure 3:
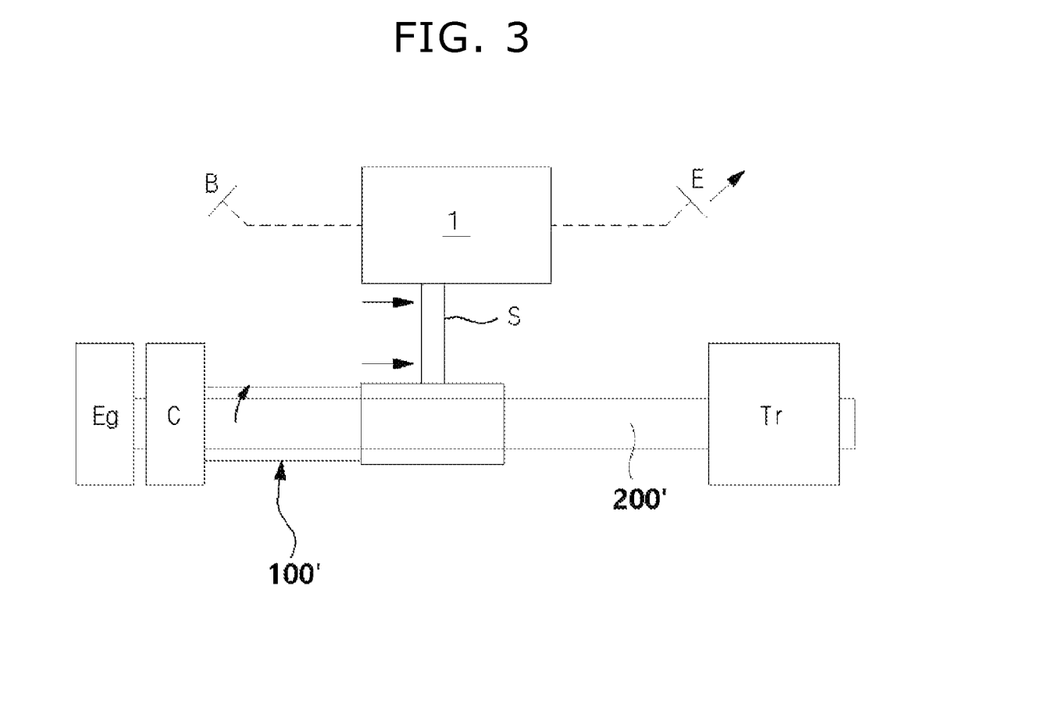
FIG. 3 is a schematic drawing of the clutch system when the driver releases the accelerator pedal from the state shown in FIG. 2.

FIG. 3 is a schematic drawing of the clutch system when the driver releases the accelerator pedal E from the state shown in FIG. 2.

When the driver releases the accelerator pedal E, the connection member S linearly moves a bit to a second direction of FIG. 3, to the right side for example, according to the operation of the power transmission device 1. Then, the driving shaft 100' linearly moves a bit to the right side, and the linear motion of the driving shaft 100' is converted to rotary motion of the clutch assembly C, which rotates in an opposite direction to a direction that the clutch assembly C rotates in FIG. 2. In this instance, the location of the clutch assembly C is different from that in the first state; however, "a second state", in which the clutch assembly C transmits the rotational force of the engine Eg to the transmission Tr through the input shaft 200', keeps the same.

In general, the clutch has a function of connecting between the engine and the transmission when the accelerator pedal E is either pressed or released. In this respect, the functions of clutch assembly C in FIGS. 2 and 3 may be essentially the same.

Figure 4:
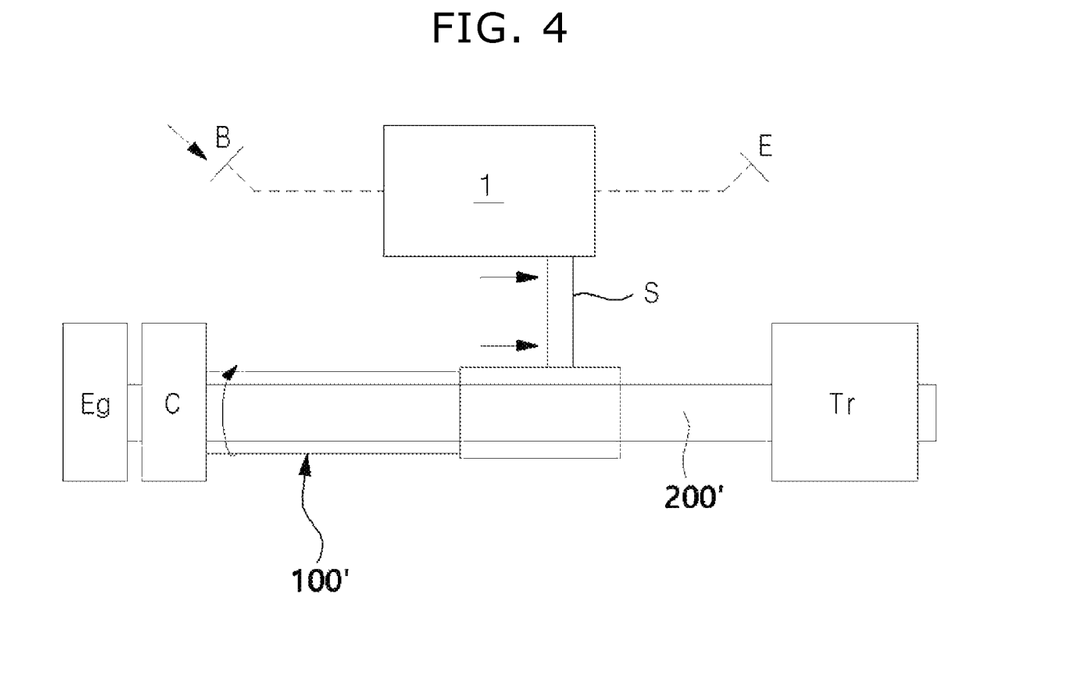
FIG. 4 is a schematic drawing of the clutch system when the driver presses the brake pedal from the state shown in FIG. 3, the state that the driver releases the accelerator pedal.

FIG. 4 is a schematic drawing of the clutch system when the driver presses the brake pedal B from the state shown in FIG. 3. The state shown in FIG. 3 refers to when the driver releases the accelerator pedal E.

When the driver presses the brake pedal B, the connection member S linearly moves to the second direction of FIG. 4, to the right side for example, according to the operation of the power transmission device 1. Then, the driving shaft 100' linearly moves to the right side, and the linear motion of the driving shaft 100' is converted to rotary motion of the clutch assembly C, which rotates in an opposite direction to the direction shown in FIG. 2. In this instance, the clutch assembly C transitions to "a third state". In the third state, the clutch assembly C cuts off the connection between the engine Eg and the input shaft 200', and does not transmit power to the transmission Tr. The difference from the state shown in FIG. 3 is that the connection member S of the power transmission device 1 moves further to the right side. The clutch assembly C rotates further to the same direction as shown in FIG. 3, and transitions to the definite cut-off state, in which the rotational force of the engine Eg is not transmitted to the input shaft 200'.

Figure 5:
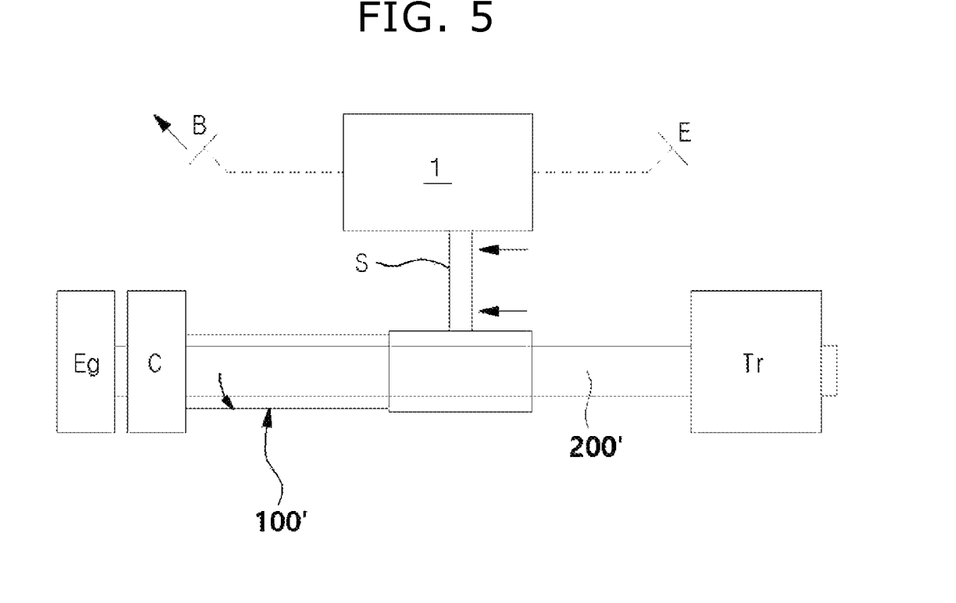
FIG. 5 is a schematic drawing of the clutch system when the driver releases the brake pedal from the state shown in FIG. 4, the state that the driver presses the brake pedal.

FIG. 5 is a schematic drawing of the clutch system when the driver releases the brake pedal B from the state shown in FIG. 4. The state shown in FIG. 4 refers to when the driver presses the brake pedal B.

When the driver releases the brake pedal B, the connection member S linearly moves a bit to the first direction of FIG. 2, to the left side for example, according to the operation of the power transmission device 1. Then, the driving shaft 100' linearly moves a bit to the left side, and the linear motion of the driving shaft 100' is converted to rotary motion of the clutch assembly C in the same direction as the direction shown in FIG. 2. In this instance, the clutch assembly C is converted to "a fourth state", a so-called semi-clutch state, in which the flywheel of the engine Eg is about to come into contact with disk. The term "semi-clutch state" in the present invention is used to indicate an initial, unstable state of transmission from a rotational force of the engine Eg to the transmission Tr. Even though the term "semi-clutch state" in the present invention uses the same word "semi-clutch state" referring to a state, in which a clutch pedal in a manual vehicle is released, the "semi-clutch state" in the present invention is fundamentally different from that in manual vehicles in that the brake pedal B is released in the "semi-clutch state" in the present invention.

Hereafter, "semi-clutch state" will be referred to as a transition state or an intermediate state.

To drive the vehicle, the driver starts the vehicle, pressing the brake pedal B, and presses the accelerator pedal E after releasing the brake pedal B. In this case, the states of the clutch system sequentially transition as shown in FIGS. 4, 5, and 2. In other words, the clutch system sequentially transitions to the state of a cut-off between the engine Eg and the transmission Tr; a state of an initial power transmission, a semi-clutch state or transition state; and a state of a power connection between the engine Eg and the transmission Tr. When the driver repetitively presses and the releases the accelerator pedal E and the brake pedal B while driving, the clutch system also transitions to any one state of FIGS. 2 to 5 or keeps the previous state. The clutch system can eliminate a clutch pedal of a manual vehicle, and can be applied to all kind of vehicles including manual and automatic vehicles.

<Structure of Clutch Assembly>

The clutch assembly described below can be employed in any structure that can transmit or clamp power, interlocking with the accelerator pedal E and the brake pedal B. Accordingly, embodiments shown in FIG. 6 are provided for explanation, and are not restricting or limiting the scopes of the inventive concepts of the present invention.

Figure 6:
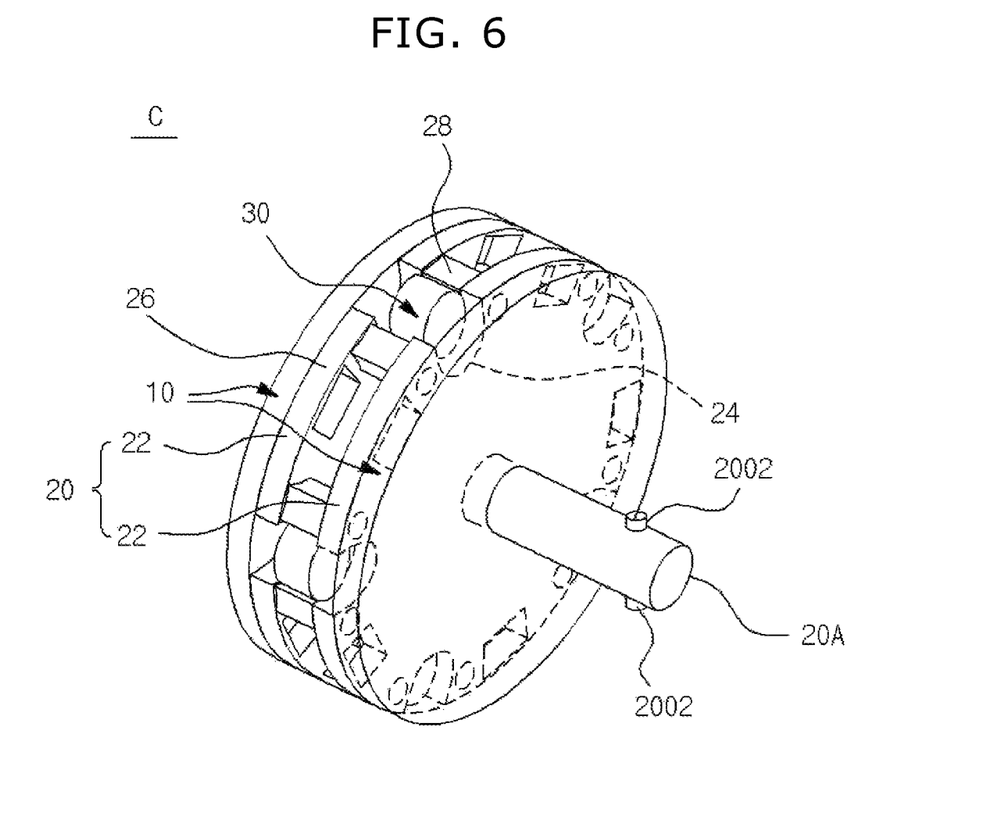
FIG. 6 is a perspective view of rims and a forked part included in a clutch assembly of the present invention. The rims form a frame of the clutch assembly, and the forked part is disposed between the rims.

FIG. 6 is a perspective view of rims 10 and a forked part 20 included in the clutch assembly C. The rims 10 form a frame of the clutch assembly C, and the forked part 20 is disposed between the rims 10.

The rims 10 consist of a pair of circular disks facing each other. The disks are joined together by tightening tools (not shown), and function as an integrated one body. The rims 10 act as a housing.

Figure 7:
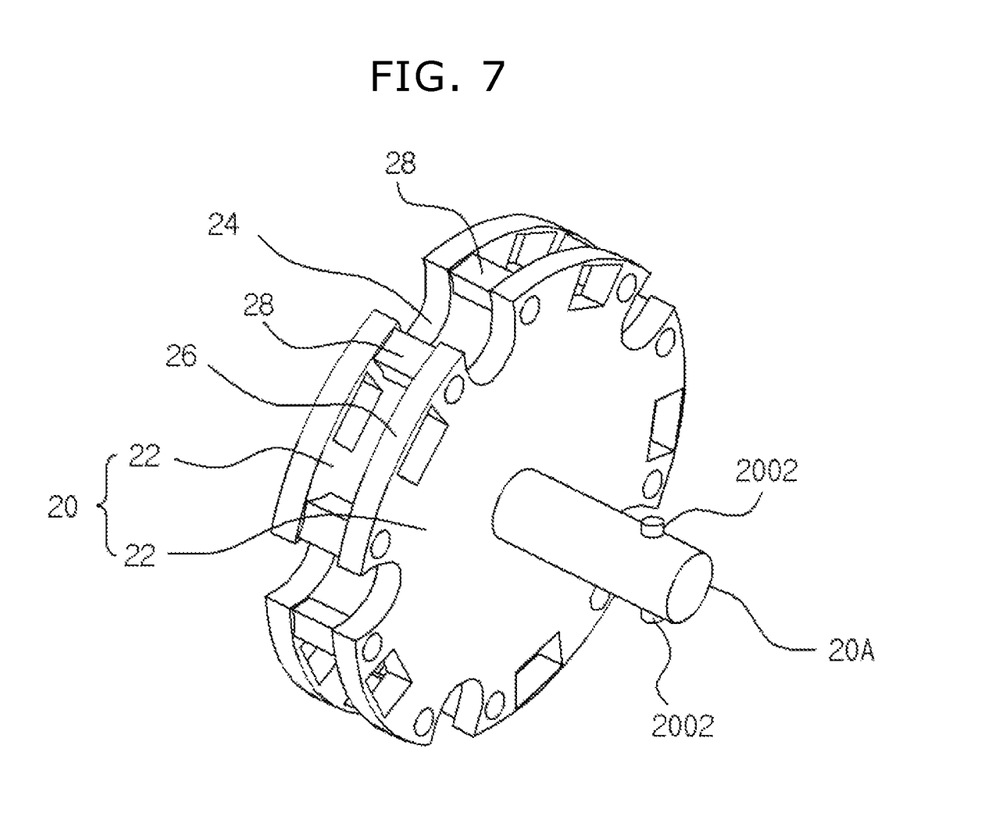
FIG. 7 is a drawing magnifying a portion of FIG. 6.

As illustrated in FIG. 7, the forked part 20 includes forked plates 22, a pair of approximately circular discs facing each other. On the outer circumference of the forked plate 22, concave curved parts 24, having five concaves for example, are formed at regular intervals, and the connection parts 26 connect between the concave curved parts 24. Forks 28 are installed on both sides of the connection part 26. Between the forks 28 facing each other between two connection parts 26, a rotary member 30, such as a needle bearing, is installed.

The rotary member 30 meets with the forks 28 in both sides. In other words, the forks 28 have a function of supporting the rotary member 30. The rotary member 30 is an independent element from the forked part 20. The rotary member 30 is mounted on the concave curved part 24, and clipped by the forks 28; accordingly, when the rotary member 30 rotates, the forked parts 20 also rotate. A rotary shaft 20A is formed in the center of the forked part 20, and the rotation of the rotary shaft 20A is transmitted to the transmission Tr.

This invention is characterized by installations of an in-cam 100 adjacent to the bottom of the rotary member 30 and an out-cam 200 adjacent to the top of the rotary member 30, in the empty space between a pair of forked plates 22.

Figure 8:
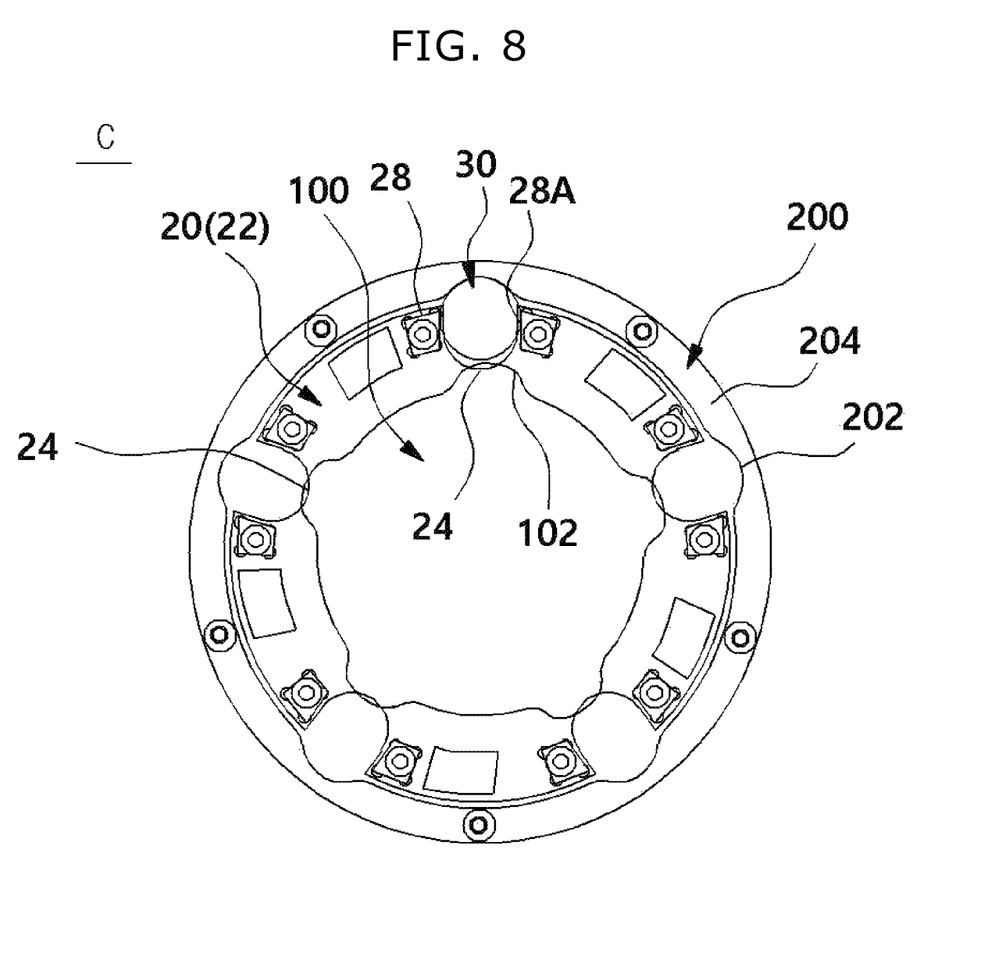
FIG. 8 is a cross-sectional view of the clutch assembly, cut in a space between forked plates of the forked part.

FIG. 8 is a cross-sectional view of the clutch assembly C, cut in a space between the forked plates 22.

The in-cam 100 has a pentagonal circular shape with a smaller diameter than that of the forked plate 22. The out-cam 200 is a circular disk shape with a larger diameter than that of the forked plate 22. The in-cam 100 and out-cam 200 are only connected by the rotary member 30, and are dynamically disconnected from each other. Therefore, even if any one of the in-cam 100 and out-cam 200 rotates, the other does not automatically rotate. Because the in-cam 100 and out-cam 200 are placed in the empty space between the forked plates 22, there is no collision or interference between the in-cam 100 and the forked plates 22, or between the out-cam 200 and the forked plates 22 when the in-cam 100 or out-cam 200 rotates. The in-cam 100 and out-cam 200 does not consist of double plates, such as the rim 10 or the forked part 20. Each of the in-cam 100 and out-cam 200 is a single plate with a certain thickness.

The in-cam 100 is connected to the rotary shaft of the engine Eg, which is not illustrated. Therefore, the in-cam 100 is a dependent member that rotates automatically according to the engine Eg. The in-cam 100 has curved convex surfaces 102, having five convex parts for example, on the outer circumference of the in-cam 100. The curved convex parts 102 protrude outward at equal intervals according to the number of the rotary members 30.

On the outer circumference of the out-cam 200, rims 204 are formed. On the inner side of the rim 204, five curved receptive surfaces 202 that are concave toward the outer surface of the rim 204 at equal intervals according to the number of rotary members 30. Each rotary member 30 is aligned to each convex surface 102 and receptive surface 202. In FIG. 8, although a single rotary member 30 is shown, five rotary members 30 are mounted on the clutch assembly C.

The out-cam 200 rotates clockwise or counterclockwise depending on pressing or releasing of the accelerator or brake pedal E,B. The driving shaft 100' is connected to the shaft of the out-cam 200, which is not illustrated, and the linear motion of the driving shaft 100' is converted into the rotary motion of the out-cam 200 through the shaft of the out-cam 200. Accordingly, the position of the rotary member 30 received in the receptive surfaces 202 is moved.

In FIG. 8, the rotary member 30 comes in contact with the apex of the receptive surfaces 202, and is fully received. Accordingly, the rotary member 30 is spaced apart from the convex surface 102 with a fine distance. Therefore, even if the engine Eg and the in-cam 100 rotate, the rotary member 30 and the forked part 20 supporting the rotary member 30 do not rotate, and a rotational force is not transmitted to the transmission Tr. In this respect, FIG. 8 illustrates the state of complete power disconnection by pressing the brake pedal B on the vehicle.

Figure 9:
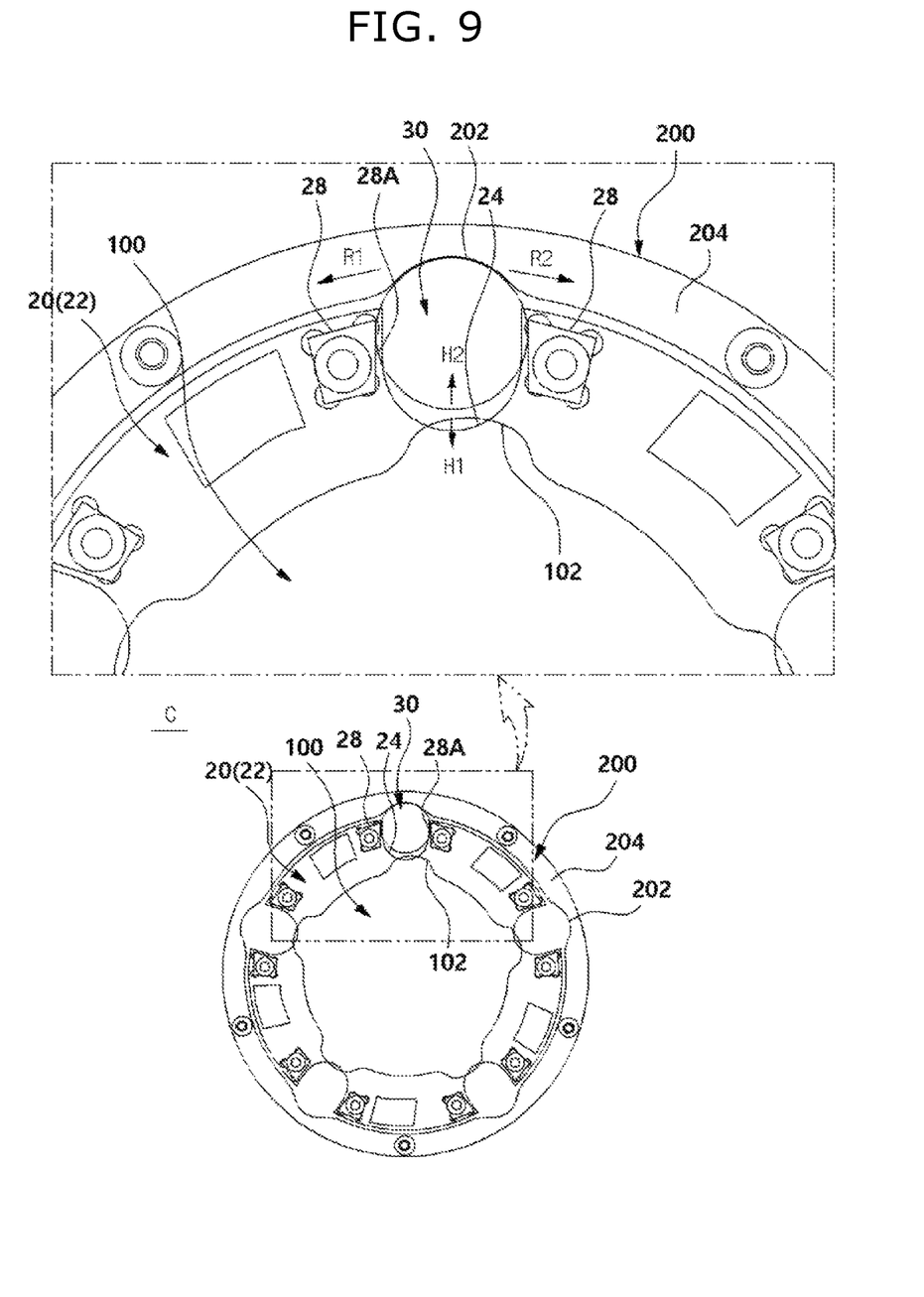
FIG. 9 is a drawing magnifying a portion of FIG. 8.

Referring to FIG. 9 magnifying a portion of FIG. 8, the operation of the clutch assembly C will be described.

In the state of FIG. 9, when the out-cam 200 rotates counterclockwise R1, the receptive surfaces 202 rotate in the same direction. In this instance, the other points other than the apex of the receptive surfaces 202 forcibly push the rotary member 30 downward; accordingly, the rotary member 30 moves in a downward direction H1. Because the rotary member 30 is supported by the side 28A of the forks 28 as described above, and the forked part 20 does not rotate even if the out-cam 200 rotates, the rotary member 30 does not move in lateral directions. Thus, the motion of the rotary member 30 in the downward direction H1 follows a linear path close to the vertical line along the side 28A of the forks 28. When the rotary member 30 moves downward, the rotary member 30 comes in contact with the convex surface 102 of the in-cam 100. Accordingly, when the engine Eg is driven and the in-cam 100 rotates, the rotary member 30 rotates according to the rotation of the convex surface 102. Therefore, the forked part 20 clipping the rotary member 30 also rotates, and the rotational force is transmitted to the transmission Tr through the rotary shaft 20A of the forked part 20. The out-cam 200 rotates according to the rotation of the rotary member 30 because the rim 204 of the out-cam 220 is always in contact with the rotary member 30.

Likewise, if the out-cam 200 rotates clockwise R2 from the state shown in FIG. 9, the principle explained above can be applicable.

<Rotary Shaft Assembly>

Next, a rotary shaft assembly according to an embodiment of the present invention is described. The rotary shaft assembly is a device that converts linear motion of the driving shaft 100' to rotary motion of the out-cam 200 of the clutch assembly C. The following is one example of the present invention, and any structure that can convert linear motion of one member to rotary motion of other members, may be employed.

Figure 10:
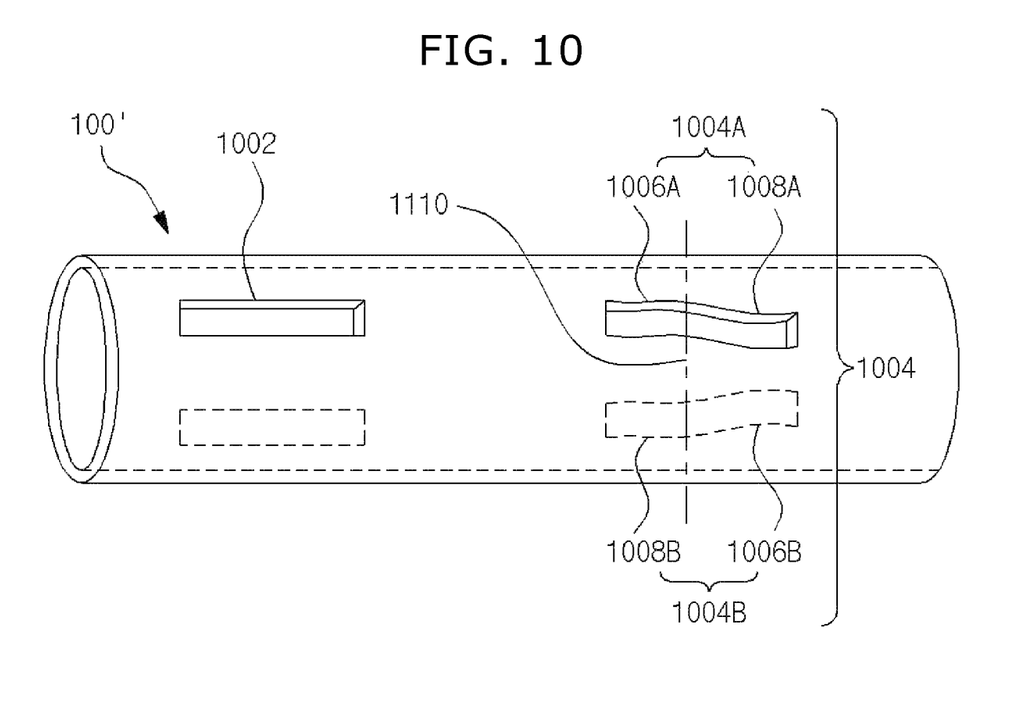
FIG. 10 is a perspective view of a driving shaft of a rotary shaft assembly of the present invention.

Referring to FIG. 10, a first guide slot 1002 and a second guide slot 1004 are formed on the sleeve of the driving shaft 100' in the area adjacent to the clutch assembly C. Although not shown, the clutch assembly C is located on the left side of the FIG. 10, and the power transmission device 1 is located on the right side of FIG. 10.

The first guide slots 1002 are a pair of long, straight channel shapes with specified lengths, formed along the longitudinal direction of the driving shaft 100'. The pair of first guide slots 1002 may face each other with 180 degrees therebetween, but are limited to.

The second guide slots 1004 also have a second upper guide slot 1004A and a second lower guide slot 1004B facing each other. The second upper guide slot 1004A comprises a first path 1006A, which is a linear channel with a specified length, and a second path 1008A, which is an inclined channel connected to the first path 1006A. The second lower guide slot 1004B is a shape that the second upper guide slot 1004A rotates 180 degrees. In other words, a third path 1008B is formed along the outer surface of the driving shaft 100' corresponding to the first path 1006A, and a fourth path 1006B, which is an inclined channel with a specified length, is formed corresponding to the second path 1008A. The boundaries between the first path 1006A and the second path 1008A and between the third path 1008B and fourth path 1006B are the same along the circumferential direction of the driving shaft 100', as shown by the imaginary line. The lengths of the first path 1006A and the third path 1008B are the same, and the lengths of the second path 1008A and fourth path 1006B are the same. The second upper guide slot 1004A and the second lower guide slot 1004B may face each other with 180 degrees therebetween, but are not limited to.

Figure 11:
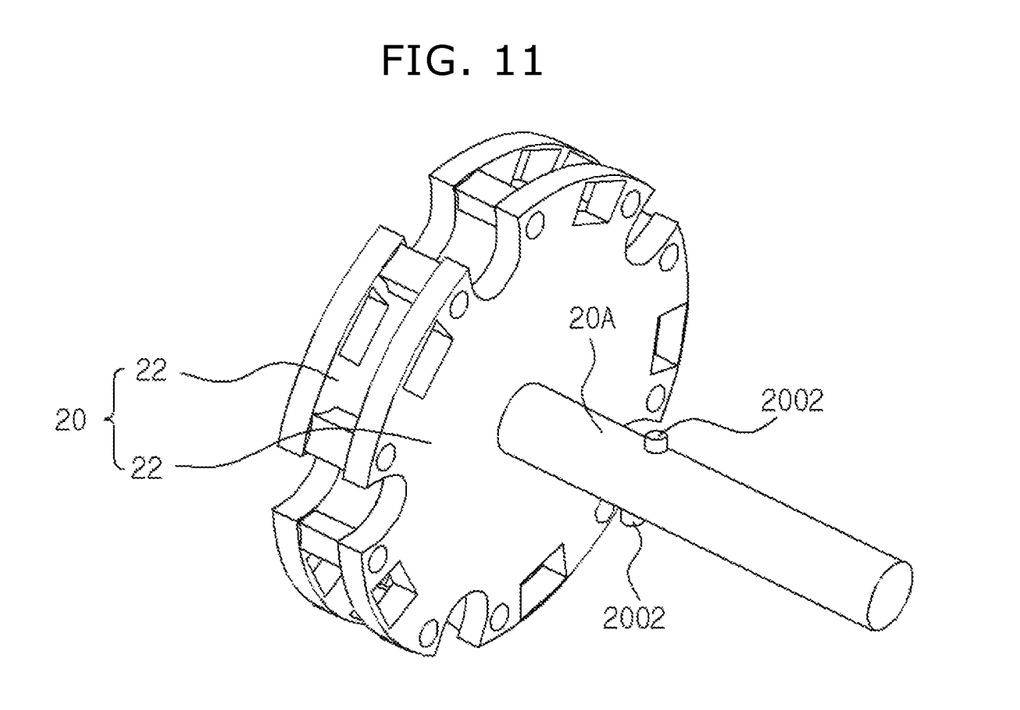
FIG. 11 is a perspective view of the forked part including a rotary shaft of the present invention.

Referring to FIG. 11, a pair of projections 2002 are formed on the rotary shaft 20A of the forked part 20. The projections 2002 are protruded from the sleeve of the rotary shaft 20A outward in a radial directions perpendicular to the longitudinal direction of the rotary shaft 20A. The pair of projections 2002 are employed to be inserted into each first guide slot 1002. The separation distance between the protrusions 2002 in the circumferential direction is the same as the separation distance of the first guide slot 1002, and the positions of the protrusions 2002 along the sleeve in the longitudinal direction are the same.

Figure 12:
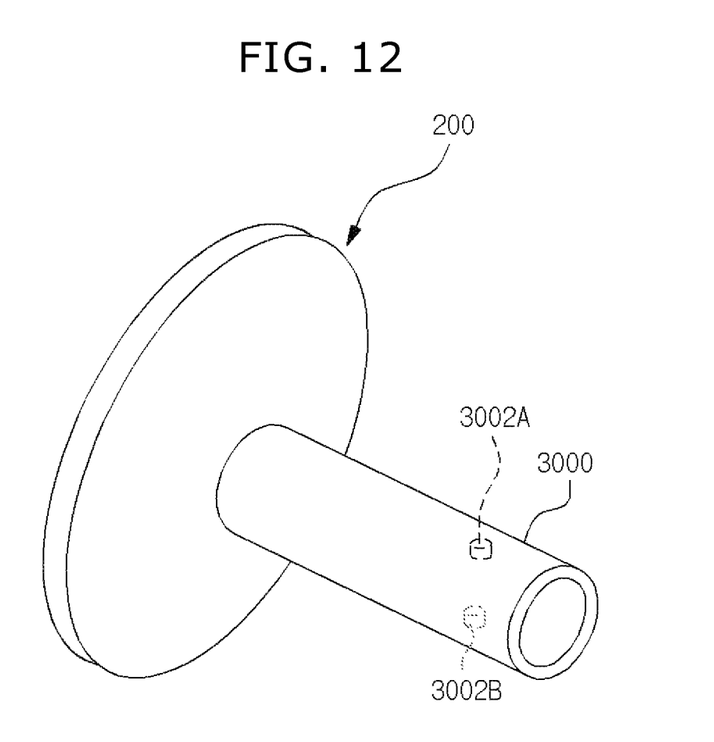
FIG. 12 is a perspective view of a clutch assembly including a rotary shaft of an out-cam of the present invention.

Referring to FIG. 12, a first and second protrusions 3002A, 3002B are formed on the rotary shaft 3000 of the out-cam 200. The first and second protrusions 3002A, 3002B are protruded from the sleeve of the rotary shaft 3000 inward in a centripetal direction, which is perpendicular to the longitudinal direction of the rotary shaft 3000. The first protrusion 3002A is inserted into the second upper guide slot 1004A, and the second protrusion 3002B into the second lower guide slot 1004B. The separation distance between the first and second protrusions 3002A, 3002B in the circumferential direction is the same as the separation distance between the second upper and second lower guide slots 1004A, 1004B, and the positions of the first and second protrusions 3002A, 3002B along the sleeve in the longitudinal direction are the same.

Figure 13:
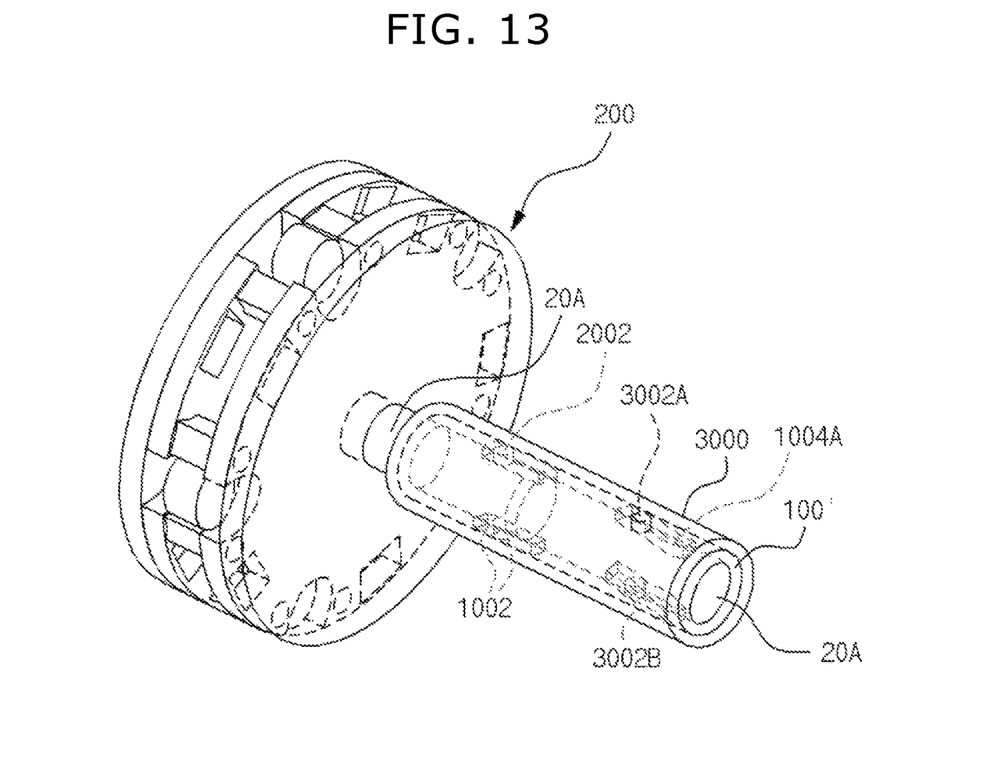
FIG. 13 is a perspective view of a combination of the rotary shaft assembly and the clutch assembly of the present invention.

FIG. 13 is a perspective view shown the structural connections between the driving shaft 100' and the rotary shaft 20A of the forked part 20, and between the driving shaft 100' and the rotary shaft 3000 of the out-cam 200. The diameter of the driving shaft 100' is greater than that of the rotary shaft 20A, and smaller than that of the rotary shaft 3000. Thus, if the three shafts are combined in the state in which the first guide slot 1002 of the driving shaft 100' faces each protrusion 2002 below the driving shaft 100', and the first and second protrusions 3002A, 3002B above the driving shaft 100', then the protrusions 2002 are inserted to the first guide slot 1002 of the driving shaft 100' from the bottom to the top, and at the same time, the first and the second protrusion 3002A, 3002B are inserted to the second upper and second lower guide slots 1004A, 1004B from the top to the bottom.

The diameter of the rotary shaft of the in-cam 100, which is not illustrated, may be smaller than that of the rotary shaft 20A of the forked part 20, and joined to the rotary shaft 20A, or the rotary shaft 20A itself may be a part of the rotary shaft of the in-cam 100. Therefore, the rotation of the engine Eg is transmitted to the transmission Tr through the driving shaft 100' without interference or collision with the rotary shaft assembly of the present invention.

Figure 14:
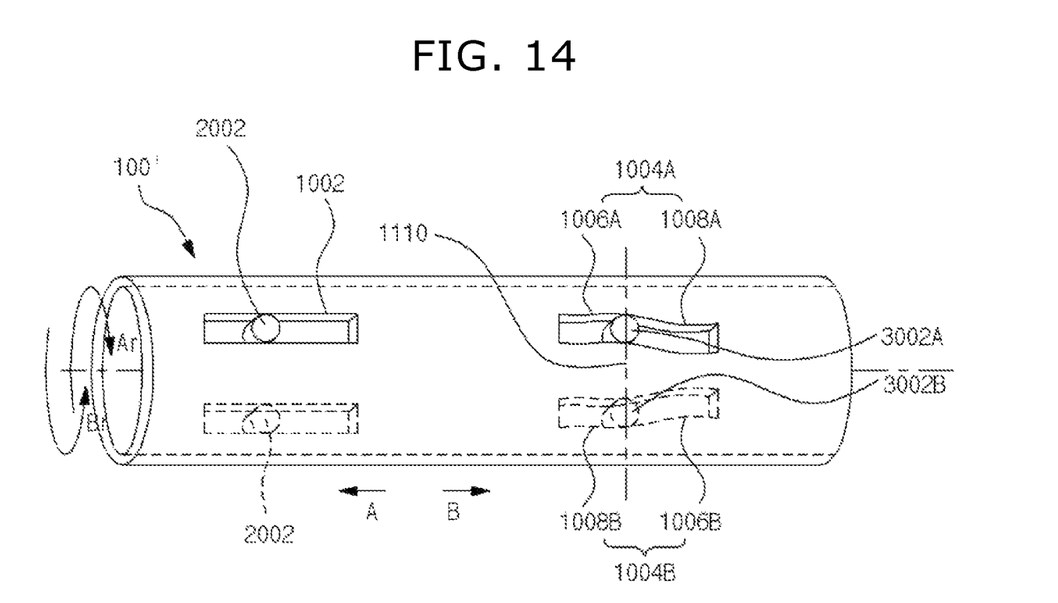
FIG. 14 is a drawing for explaining functions of the rotary shaft assembly of the present invention.

Referring to FIG. 14 based on the explanation above, the rotation of the out-cam 200 according to linear motion of the driving shaft 100' will be described.

When the driver presses the accelerator pedal P, and the driving shaft 100' is linearly moved to the left side, that is, to an A direction, the first guide slot 1002 moves in the same direction, but the protrusions 2002 does not move in the circumferential direction because the first guide slot 1002 is a line shape. Therefore, the forked part 20 does not rotate and remains in a stable position.

Meanwhile, when the second upper guide slot 1004A moves linearly, the slope of the second path 1008A pressurizes the first protrusion 3002A. Accordingly, the first protrusion 3002A cannot stay in the original place, and the first protrusion 3002A is pressurized to rotate in a first direction Ar, by the angle formed between the first path 1006A and the second path 1008A. Likewise, when the second lower guide slot 1004B moves linearly, the slope of the fourth path 1006B pressurizes the second protrusion 3002B. Accordingly, the second protrusion 3002B cannot stay in the original place, and the second protrusion 3002B is pressurized to rotate in the first direction Ar, by the angle formed between the third path 1008B and the fourth path 1006B. Therefore, the rotary shaft 3000 of the out-cam 200 is supported by the first and second protrusion 3002A, 3002B and rotates in the first direction Ar, and eventually the out-cam 200 rotates.

In the state that the driving shaft moves in the A direction, when the brake pedal is pressed in reverse, and the driving shaft 100' moves linearly to the right side, in the B direction for example, the first guide slot 1002 moves in the same direction, but the protrusions 2002 does not move in the circumferential direction because the first guide slot 1002 is a line shape. Therefore, the forked part 20 does not rotate and remains in the stable position.

Meanwhile, when the second upper guide slot 1004A moves linearly, the slope of the second path 1008A pressurizes the first protrusion 3002A. Accordingly, the first protrusion 3002A cannot remain in the original place and is pressurized to rotate in a second direction Br, by the angle formed between of the first path 1006A and the second path 1008A. Likewise, when the second lower guide slot 1004B moves linearly, the slope of the fourth path 1006B pressurizes the second protrusion 3002B. Accordingly, the second protrusion 3002B cannot stay in the original place, and the second protrusion 3002B is pressurized to rotate in the first direction Ar, by the angle formed between the third path 1008B and the fourth path 1006B. Therefore, the rotary shaft 3000 of the out-cam 200 is supported by the first and second protrusion 3002A, 3002B and rotates in the second direction Br, and eventually the out-cam 200 rotates.

While embodiments of the present invention have been described, the present invention is not limited to what has been particularly shown.

What is claimed is:

1. A rotary shaft assembly converting linear motion of a driving shaft to rotary motion of a rotatable cam of a clutch assembly,
    wherein the driving shaft linearly moves according to pressing or releasing of an accelerator pedal or brake pedal,
    wherein at least one protrusion is formed in a sleeve of a rotary shaft of the cam,
    wherein at least one guide slot is formed on the driving shaft to receive the protrusion, respectively,
    wherein the guide slot includes:
        a first path having a linear shape, and
        a second path extending to form an inclined angle with the first path,
    wherein the protrusion rotates in a first rotary direction, by an inclined angle formed between the first and the second path according to linear movement of the driving shaft in a first linear direction, thereby rotating the cam.

2. The rotary shaft assembly of claim 1, wherein the protrusion rotates in a second rotary direction that is opposite to the first rotary direction, by an inclined angle formed between the first and the second path according to linear movement of the driving shaft in a second linear direction that is opposite to the first linear direction, thereby rotating the cam.

3. The rotary shaft assembly of claim 2, wherein the clutch assembly includes a forked part having a rotary shaft that does not rotate regardless of linear movement of the driving shaft,
    wherein at least one protrusion is formed on the rotary shaft of the forked part,
    wherein the driving shaft has a guide slot having a linear shape to receive the protrusion formed in the rotary shaft of the forked part.

4. A rotary shaft assembly converting linear motion of a driving shaft to rotary motion of a cam,
    wherein at least one protrusion is formed in a sleeve of a rotary shaft of the cam,
    wherein at least one guide slot is formed on the driving shaft to receive the protrusion, respectively,
    wherein the guide slot includes:
        a first path having a linear shape, and
        a second path extending to form an inclined angle with the first path,
    wherein the protrusion rotates in a first rotary direction, by an inclined angle formed between the first and the second path according to linear movement of the driving shaft in a first linear direction, thereby rotating the cam.

5. A rotary shaft assembly converting linear motion of a driving shaft to rotary motion of a rotatable cam of a clutch assembly, wherein the driving shaft linearly moves according to pressing or releasing of an accelerator pedal or brake pedal, wherein a first protrusion and a second protrusion are formed in a sleeve of a rotary shaft of the cam, wherein an upper guide slot and a lower guide slot are formed on the driving shaft to receive the first and the second protrusion, respectively, wherein the upper guide slot includes:
 a first path having a linear shape, and
 a second path extending to form an inclined angle with the first path, wherein the lower guide slot has the same shape as the upper guide slot rotated 180 degrees, and the lower guide slot includes:
 a third path having a linear shape, and
 a fourth path extending to form an inclined angle with the third path, wherein the first protrusion rotates in a first rotary direction, by an inclined angle formed between the first and the second path according to linear movement of the driving shaft in a first linear direction, wherein the second protrusion rotates in the first rotary direction, by an inclined angle formed between the third and the fourth path according to linear movement of the driving shaft in the first linear direction, wherein the cam rotates according to rotations of the first and the second protrusion.

* * * * *